United States Patent [19]

Buchanan et al.

[11] Patent Number: 4,550,342

[45] Date of Patent: Oct. 29, 1985

[54] HORIZONTAL SYNC DETECTOR

[75] Inventors: James E. Buchanan, Bowie; John M. Shipley, Pasadena, both of Md.

[73] Assignee: The United States of America as represented by the Secretary of the Army, Washington, D.C.

[21] Appl. No.: 518,169

[22] Filed: Jul. 28, 1983

[51] Int. Cl.$^4$ ............................................. H04N 5/08
[52] U.S. Cl. ................................................... 358/153
[58] Field of Search ...................... 358/153, 148, 156; 328/115, 139; 307/358, 351

[56] References Cited

U.S. PATENT DOCUMENTS

| | | | |
|---|---|---|---|
| 3,706,847 | 12/1972 | Smeulers | 358/153 |
| 3,718,864 | 2/1973 | Kelly et al. | 328/115 |
| 3,869,624 | 3/1975 | Fletcher et al. | 307/351 |
| 4,468,625 | 8/1984 | Tandart et al. | 358/155 |

Primary Examiner—John C. Martin
Assistant Examiner—David E. Harvey
Attorney, Agent, or Firm—Anthony T. Lane; Robert P. Gibson; Michael C. Sachs

[57] ABSTRACT

An improved circuit for detection of horizontal sync pulses for use in high resolution digital processing of video data when low line-to-line registration uncertainty is required. The detector comprises three main parts, a negative peak detector, a proportioning amplifier and a high speed comparator for level detection. The peak detector allows a reference point to be established over a wide signal and temperature range with little error due to inherent accuracy and stability of the operational amplifier circuitry, and has an ability to adjust the triggering point of a comparator dependent upon video signal level.

6 Claims, 2 Drawing Figures

HORIZONTAL SYNC DETECTOR

GOVERNMENTAL INTEREST

The invention described herein was made in the course of a contract number DAAK10-79-C-0216 with the Government and may be manufactured, used and licensed by or for the Government for governmental purposes without the payment to us of any royalty thereon.

FIELD OF THE INVENTION

The invention relates to an improved circuit for the detection of horizontal sync pulses in a composite video waveform. The invention is used in applications where high resolution digital processing of video data with very small line-to-line registration uncertainty is required.

BACKGROUND OF THE INVENTION

Horizontal sync detection circuits described in the prior art literature are generally intended for home TV or other commercial video applications. These prior art circuits perform satisfactorily in applications which have very limited temperature variations. When the aforementioned prior art circuits are used in military applications, which can vary from −55° C. to +125° C., extensive modifications are required to the transistors, diodes, resistors and capacitors in order to achieve temperature compensation. The prior art horizontal sync circuits do not allow for a two-to-one or greater variation in video signal amplitude, particularly where the video signal being processed is taken from a video tape recorder. Existing detector circuits typically clamp the negative peaks of the horizontal sync pulses to a fixed level and have a fixed threshold above the clamping level to sense the presence of a horizontal sync pulse in the video data stream. The problem with such prior art circuits is that the clamping levels and the threshold levels are generally established by diode drops or transistor base-emitter drops which are not temperature compensated. See FIG. 1 for a composite video wave form. It may be observed from the waveform that, for example, if the sync detector triggering threshold is set for a fixed 125 mV above the negative peak, the midpoint of the horizontal sync pulse, the ideal point for a nominal level signal, trouble develops if the signal is reduced to less than one-half the nominal value. The problem being that with triggering threshold fixed, the signal moves up into the video blanking levels. Thus it can be seen that the triggering point must be adjustable so that it is proportional to the composite video signal level.

The negative peaks of the horizontal pulses, the points of concern, vary in amplitude for several reasons. Different sources have various levels even though standards, such as EIA Standard RS-170 and RS-232. However, even if the standards were adhered to, degradation can occur and in most cases, the input video is capacitively coupled so that the peak amplitude of the horizontal pulses is dependent on the video content of the signal. That is, the negative peaks move up or down depending on the picture content, the average value is zero for a capacitive coupled signal. Thus a means for sensing the variations of the peaks of the horizontal signal is needed in all cases.

SUMMARY OF THE INVENTION

An improved circuit for detection of horizontal sync pulses in a composite video wave form utilizes a negative peak detector coupled to a proportioning amplifier and a high speed comparator.

The detector comprises three main parts, a negative peak detector, a proportioning amplifier, and a high speed comparator. The negative peak detector is needed as a circuit element responsive to negative peaks only, charging to the most negative value seen on the input and holding that level. The circuit responds rapidly to increasing magnitude negative peaks but slowly to decreasing amplitude peaks. An important feature of the peak detector circuit is that is does decay towards zero. The peak detector allows a reference point to be established over a wide signal and temperature range with little error due to the inherent accuracy and stability of the amplifier circuitry. Following the peak detector is a proportioning or scaling amplifier which is used to set the trigger level for the comparator. The proporting amplifier sets the reference level for the comparator at some point above the negative peaks of the horizon-sync pulse peaks. The set point being approximately 125 mV when operating with nominal video signal shown in FIG. 1. With the circuit hereinafter described, when the video signal is reduced to 125 mV which is nearly one-half the specified 280 mV sync pulse level, the triggering is reduced to 62 mV above the negative peaks of the horizontal pulser which is still half-way between the negative peak and the blanking level. The detector has an ability to adjust its triggering dependent upon signal level.

The final stage of the detector uses a high speed comparator to strip away the video data and convert the video sync information (pulse) to a Transistor Transistor Logic (TTL) logic level. This type of comparator is used so that the absolute delay variations through the comparator vary very little, and that the alignment of the line-to-line video data has very little variation. In high resolution systems it is usually desirable that the delay variations be in the order of a few nanoseconds. The peak detecting and proportioning amplifier are designed to constantly adjust and place the comparator triggering threshold as near as possible to the center level of the horizontal sync pulse to minimize the comparator's sensitivity to noise and ringing.

An object of the invention is to provide an improved horizontal sync detector which can reliably operate over the full military temperature range of −55° C. to 125° C.

Another object of the present invention is to provide an improved horizontal sync detector which allows a reference point to be established over a wide signal and temperature range with little error due to the inherent accuracy and stability of associated amplifier circuitry.

Another object of the present invention is to provide an improved horizontal sync detector with an ability to adjust its triggering point dependent upon signal levels.

A further object of the present invention is to provide an improved horizontal sync detector which allows a very high speed comparator to be used for precise data alignments while a high level of noise rejection is maintained.

For a better understanding of the present invention, together with other and further objects thereof, reference is made to the following descriptions taken in connection with the accompanying drawings.

DESCRIPTION OF THE PREFERRED EMBODIMENTS

Figure 1:
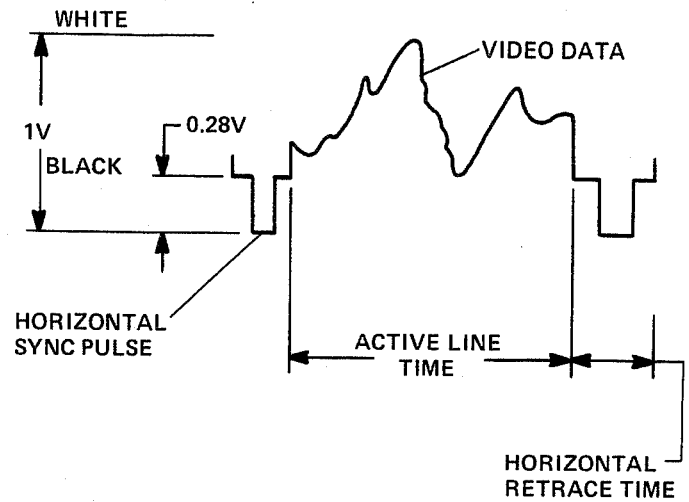
FIG. 1 is a sketch of a composite video wave form.
Figure 2:
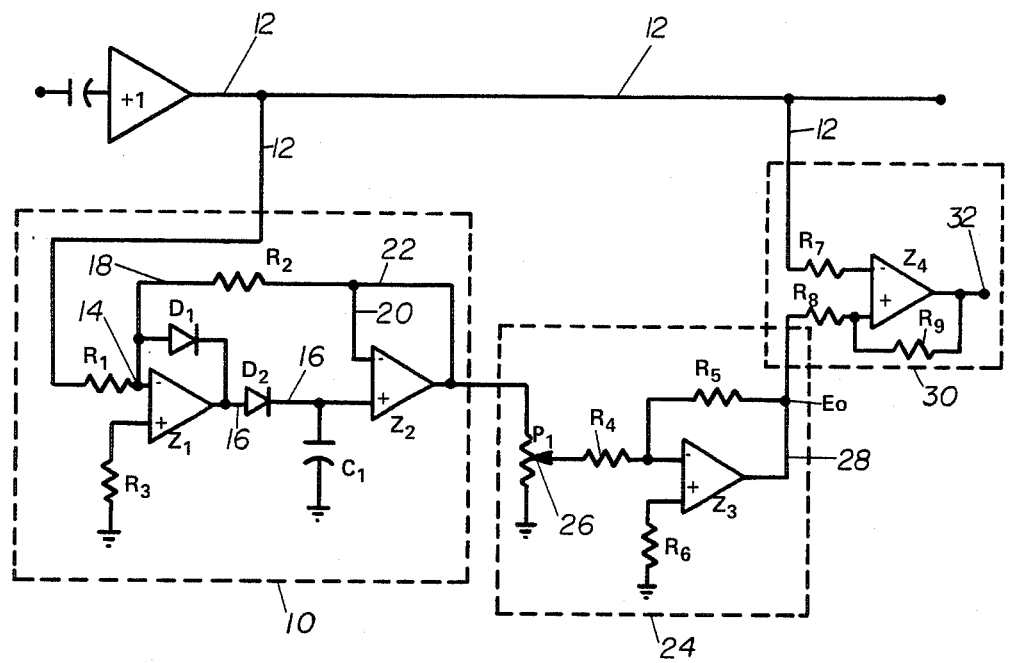
FIG. 2 is a schematic view of the horizontal sync detector circuit.

Referring now to FIG. 2, the negative peak detector circuit enclosed within dash-line box 10 includes two operational amplifiers $Z_1$ and $Z_2$ for buffering, a storage capacitor $C_1$ for storing the peak information, a first diode $D_1$ which prevents first buffer $Z_1$ from saturating in the negative direction, a second diode $D_2$ allows the storage capacitor $C_1$ to be driven in one direction only, and a pair of scaling resistors $R_1$ and $R_2$ complete the feedback paths around the amplifiers $Z_1$ and $Z_2$ and determine the throughput gain. The video input signal is fed via conductor 12, and input resistor $R_1$ to the negative input terminal 14. A biasing resistor $R_3$ connects the positive input of first amplifier $Z_1$ to ground. The output of amplifier $Z_1$ is electrically coupled via conductor 16 to the positive input terminal of the second buffer amplifier $Z_2$ through diode $D_2$. The negative input terminal 14 of first buffer amplifier $Z_1$ is electrically coupled via electrical connector 18 to the negative input of the second buffer amplifier $Z_2$ through fedback resistor $R_2$ and conductor 20. The common junction of resistor $R_2$ and conductor 20 is coupled via connector 22 to the output peak video signal of the second buffer amplifier $Z_2$. Capacitor $C_1$ is connected from the positive input terminal of amplifier $Z_2$ to ground. The diode $D_1$ is connected as a shunt for the first buffer amplifier $Z_1$ having its anode terminal electrically connected to the electrical junction of resistors $R_1$ and $R_2$ and its cathode terminal electically coupled to the output of amplifier $Z_1$.

The proportioning amplifier circuit enclosed within dash-line box 24 is electrically coupled to the output of second buffer amplifier $Z_2$ by a potentiometer $P_1$. Wiper arm 26 is electrically connected through a series scaling resistor $R_4$ to the negative input terminal of third operational amplifier $Z_3$. The positive input terminal of amplifier $Z_3$ is connected to ground through a bias current cancelling resistor $R_6$. A shunt resistor $R_5$ is connected intermediate the juntion of resistor $R_4$ and the output line 28 of the proportioning amplifier $Z_3$.

A high speed comparator circuit enclosed within dash-line box 30 includes an integrated comparator $Z_4$ such as Model LM160 manufactured by National Semiconductor Corporation. The output line 28 of the proportioning amplifier $Z_3$ is connected to the positive input terminal of comparator $Z_4$ through a series resistor $R_8$. The video input signal is fed through a balancing resistor $R_7$ to the negative input of the comparator $Z_4$. The output terminal 32 of $Z_4$ is TTL level compatible for ease in interfacing the detector to most potential associated systems.

In operation, the first stage operational amplifier $Z_1$ serves as an inverting amplifier having a feedback path completed through the second stage $Z_2$ rather than directly. Second diode $D_2$ serves to steer the direction that the storage capacitor $C_1$ can be driven. A negative input to resistor $R_1$ causes a positive output from amplifier $Z_1$, forward biasing second diode $D_2$ and charging the capacitor $C_1$ to a positive value representative of the peak negative input. The first diode $D_1$ prevents the buffer amplifier $Z_1$ from saturating in the negative direction. The second buffer amplifier $Z_2$ serves to isolate the storage capacitor $C_1$ and to complete the feedback to first amplifier $Z_1$. The throughput gain is one, determined by the ratio of feedback resistor $R_2$ divided by input resistor $R_1$. The changing second diode $D_2$ drop with changing temperature does not effect the overall gain since it is inside the gain loop of $Z_1$. Filtering decoupling, and compensation are not shown in this instance, but can be included to maintain the functional clarity of the circuit. The principal feature and main requirement for the circuit is to place the peak detecting steering diode inside the control loop of the operational amplifier circuit to minimize the reference level change with temperature. As can be seen from the above, the level of the threshold point is only slightly greater than a diode drop change (approximately 100 mV) that occurs for a 50° C. temperature change. Thus prior art circuits with thresholds established by diodes or transistor base-emitter junctions can not function properly over a wide temperature range. A further improvement of this detector is that the storage capacitor $C_1$ is not in the feedback path of either amplifier $Z_1$ or $Z_2$ and therefor the negative peak detector circuit does not tend to saturate and does not require a reset function to prevent saturation.

The proportioning amplifier circuit within box 24 is designed as a unity gain inverting operational amplifier. Resistors $R_4$ and $R_5$ are selected to be of equal value, and are selected to set the gain from the potentiometer $P_1$ wiper arm to the output $E_o$ equal to one with an inversion of 180°. Since the gain is determined by the ratio of resistors $R_5$ to $R_4$, the gain is principally dependent on the temperature variation of $R_5$ and $R_4$. Use of high stability resistors, ones with temperature coefficients in the order of 25 ppm/°C. or less, allows the gain stability of the circuit to be precisely controlled. Resistor $R_6$ is chosen to equal the parallel value of resistors $R_4$ and $R_5$ to negate the potential amplifier $Z_3$ error that could be temperature related to changes in bias current.

It is generally well known in the art that when both inputs of an operational amplifier see the same equivalent resistance the bias gain errors are cancelled. Potentiometer $P_1$ is used in the input stage of the proportioning amplifier circuit 24 to set a reference potential for the comparator 30. The adjustment allows the detector to be trimmed for variations in component values that might occur from system to system and to allow the detector to be adjusted for use with systems with differing video input levels. When the wiper arm of potentiometer $P_1$ is set at the top of its travel, the gain through the entire circuit is unity. Thus the potentiometer $P_1$ allows the gain to be trimmed from unity down to zero, a value of gain near 0.9 was found to be a typical operating point. The following component values were used in the preferred embodiment:

| | |
|---|---|
| $R_1 = 20K\Omega$ | $C_1 = 0.01 \mu F$ |
| $R_2 = 20K\Omega$ | $P_1 = 5K\Omega$ |
| $R_3 = 10K\Omega$ | $Z_1, Z_2, Z_3$ are type 741 amplifiers, |
| $R_4 = 20K\Omega$ | $Z_4$ is a type LM160 amplifier |
| $R_5 = 20K\Omega$ | |
| $R_6 = 10K\Omega$ | |
| $R_7 = 100\Omega$ | |
| $R_8 = 100\Omega$ | |
| $R_9 = 47K\Omega$ | |

The resistors $R_7$, $R_8$ and $R_9$ of the comparator circuit are used to provide some hysteresis to the triggering point. The function of the comparator is to sense when the video level equals the reference value generated by the negative peak detector circuit 10 and the proportioning amplifier circuit 24 and at that point to change its output level to indicate that a sync pulse has occurred. The LM160 integrated circuit comparator $Z_4$ is used in the preferred embodiment due to its fast response time (approximately 16 nanoseconds) and its high sensitivity. The comparator $Z_4$ only requires a very small voltage differential (1 mV or less) to switch states. Since the comparator $Z_4$ reference level is generated via the negative peak detector circuit 10 and the proporting amplifier circuit 24, both of which are temperature stable, the triggering point of comparator $Z_4$ remains stable with temperature. The resistors $R_8$ and $R_9$ are used to provide feedback so that the comparator $Z_4$ does not oscillate as the video level nears that of the reference level. About 10 millivolts of hysteresis is provided with the component values aforedescribed. The function of resistor $R_7$ is to balance the impedance seen by both inputs of comparator $Z_4$. Balancing the input impedance minimizes false triggering due to noise and minimizes potential reference point shifts due to comparator input bias current.

The foregoing disclosure and drawings are merely illustrative of the principles of this invention and are not to be interpreted in a limiting sense. I wish it to be understood that I do not desire to be limited to the exact details of construction shown and described for obvious modifications will occur to a person skilled in the art.

What is claimed is:

1. An improved horizontal sync detector circuit for use in high resolution digital processing of a video data signal which comprises:

negative peak detector circuit means for having sensitivity only to the negative peaks of said video data signal, which stores a voltage potential representing the largest signal value of said video data signal it received, and for allowing a reference point to be established despite changes in video data signal values and changes caused by range in ambient temperatures; said negative peak detector means comprising:
   a first stage operational amplifier ($Z_1$);
   a first scaling resistor ($R_1$) having a first end electrically connected to said video signal and another end coupled to the negative input terminal of said amplifier ($Z_1$);
   a biasing resistor ($R_3$) which electrically couples the positive input of said first emplifier ($Z_1$) to ground connection means;
   a first diode ($D_1$), having its anode terminal electrically connected as a shunt, at the negative terminal of said first amplifier ($Z_1$) and the said first diode's cathode terminal electrically coupled to the output of said first amplifier ($Z_1$), said first diode ($D_1$) preventing said first amplifier ($Z_1$) from saturating in a negative direction;
   a second diode ($D_2$) having an anode terminal electrically connected to the junction of the output of said first amplifier ($Z_1$) and the cathode terminal of said first diode ($D_1$);
   a storage capacitor ($C_1$) electrically coupled between a cathode terminal of said second diode ($D_2$) and ground, said second diode ($D_2$) allowing said capacitor ($C_1$) to be driven in one direction only;
   a second stage operational amplifier ($Z_2$) having a positive terminal electrically connected to a common junction between said capacitor ($C_1$) and said cathode terminal of said second diode ($D_2$), and a negative input terminal; and
   a second scaling resistor ($R_2$) having one end electrically connected to the negative input terminal of said second amplifier ($Z_2$) and to the output of said second amplifier ($Z_2$), and the other end to the negative input terminal of said first amplifier ($Z_1$), said first and second scaling resistors completing the feedback paths around said first and second amplifiers ($Z_1$) and ($Z_2$) respectively, for determining the throughput gain;

proportioning amplifier circuit means having input means electrically coupled to the output of said peak detector means for setting a triggering point at a specified point above the negative peaks of a horizontal sync pulse, and for constantly adjusting said triggering point of said detector means to be dependent upon the signal level of said video data signal and proximate to the center level of said horizontal sync pulse; and comparator circuit means electrically coupled to the output of said proportioning amplifier means and the input video data signal for stripping away the video data signal and converting the video sync information thereof to a TTL logic level.

2. An improved horizontal sync detector as recited in claim 1 wherein said proportioning amplifier circuit means includes;
   a grounded, potentiometer ($P_1$) electrically coupled to the output terminal of said second amplifier ($Z_2$);
   a fourth series scaling resistor ($R_4$) having one end electrically connected to the wiper arm of said potentiometer ($P_1$);
   a third operational amplifier ($Z_3$) having a negative input terminal connected to the other end of said fourth scaling resistor ($R_4$);
   a fifth shunt resistor ($R_5$) having one end electrically connected to the junction of fourth resistor ($R_4$) and the negative input terminal of said third amplifier ($Z_3$) and another end connected to the output of said third amplifier ($Z_3$); and
   a sixth biasing resistor ($R_6$) electrically coupled between the positive input terminal of said third amplifier ($Z_3$) and ground means: said fourth and fifth resistors being selected to be of equal value so that the gain from the wiper arm of said potentiometer ($P_1$) to the output ($E_o$) of said third amplifier ($Z_3$) is equal to a unity gain with an inversion of 180°.

3. An improved horizontal sync detector as recited in claim 2 wherein said fourth and fifth resistors ($R_4$ and $R_5$) are selected with temperature coefficients in the order of 25 ppm/°C or less.

4. An improved horizontal sync detector as recited in claim 3 wherein the resistance value of said sixth resistor ($R_6$) is chosen to be equal to the parallel value of said fourth and fifth resistors ($R_4$ and $R_5$), to negate potential third amplifier ($Z_3$) error that may be temperature related to changes in bias current in the sixth resistor ($R_6$).

5. An improved horizontal sync detector as recited in claim 4 wherein said comparator circuit means includes:
   a seventh balancing resistor ($R_7$) electrically coupled on one end to said video data signal;
   an integrated circuit comparator ($Z_4$) having the negative input terminal electrically coupled to the other end of said balancing resistor ($R_7$);
   an eighth resistor ($R_8$) electrically connected on one end to the output voltage of the third amplifier ($Z_3$)

and on the other end to the positive input terminal of said comparator ($Z_4$); and a ninth resistor electrically coupled on one end to the positive input terminal of said comparator ($Z_4$) and the other end to the output terminal of the comparator ($Z_4$).

6. An improved horizontal sync detector as recited in claim 5 wherein said comparator ($Z_4$) has a response time of approximately 16 nanoseconds.

* * * * *